US012802384B2

(12) United States Patent
Takemoto et al.

(10) Patent No.: US 12,802,384 B2
(45) Date of Patent: Nov. 17, 2026

(54) IMAGE PROCESSING METHOD AND IMAGE PROCESSING DEVICE

(71) Applicant: Panasonic Intellectual Property Management Co., Ltd., Osaka (JP)

(72) Inventors: Masato Takemoto, Osaka Fu (JP); Akihiro Odagawa, Osaka Fu (JP); Shinzo Koyama, Osaka Fu (JP); Shigeru Saitou, Kyoto Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 227 days.

(21) Appl. No.: 18/838,119

(22) PCT Filed: Mar. 23, 2023

(86) PCT No.: PCT/JP2023/011585
§ 371 (c)(1),
(2) Date: Aug. 13, 2024

(87) PCT Pub. No.: WO2023/190058
PCT Pub. Date: Oct. 5, 2023

(65) Prior Publication Data

US 2025/0148742 A1 May 8, 2025

(30) Foreign Application Priority Data

Mar. 30, 2022 (JP) ................................. 2022-057329

(51) Int. Cl.
*G06V 10/22* (2022.01)
*G01S 17/18* (2020.01)
*G06T 7/00* (2017.01)

(52) U.S. Cl.
CPC .............. *G06V 10/22* (2022.01); *G01S 17/18* (2020.01); *G06T 7/00* (2013.01); *G06T 2207/10028* (2013.01); *G06V 2201/07* (2022.01)

(58) Field of Classification Search
CPC .... G06V 10/22; G06V 2201/07; G06V 10/25; G01S 17/18; G06T 7/00; G06T 2207/10028; G06T 7/70; G06T 1/00
See application file for complete search history.

(56) References Cited

U.S. PATENT DOCUMENTS 11,681,397 B2 * 6/2023 Kitazawa ................ G06N 3/09
345/175
2006/0125679 A1 6/2006 Horibe
(Continued)

FOREIGN PATENT DOCUMENTS

JP 2006-151125 A 6/2006
JP 2007-233440 A 9/2007
(Continued)

OTHER PUBLICATIONS

International Search Report dated Jun. 13, 2023 issued in International Patent Application No. PCT/JP2023/011585, with English translation.

*Primary Examiner* — Bobbak Safaipour
(74) *Attorney, Agent, or Firm* — Rimon P.C.

(57) ABSTRACT

An image processing method includes: first processing of acquiring a range gate image using a range gate imaging device that captures an image of a set distance range for a predetermined capture area; second processing of searching for a detection target in the range gate image using a search window having a size corresponding to a capture distance from the range gate imaging device to the set distance range; and third processing of synthesizing, when a window region satisfying a predetermined condition is detected in the range (Continued)

gate image in the second processing, object information included in the window region and a grayscale image acquired using a grayscale imaging device that captures a grayscale image of the predetermined capture area and outputting the result.

20 Claims, 12 Drawing Sheets

(56) References Cited

U.S. PATENT DOCUMENTS

| | | | | |
|---|---|---|---|---|
| 2007/0286488 | A1* | 12/2007 | Fukuda | H04N 23/611 382/190 |
| 2011/0090355 | A1* | 4/2011 | Muramatsu | H04N 23/611 348/222.1 |
| 2013/0051613 | A1* | 2/2013 | Bobbitt | G06V 20/52 382/103 |
| 2014/0184811 | A1* | 7/2014 | Yoshida | G06V 30/1444 348/169 |
| 2014/0314274 | A1* | 10/2014 | Kempinski | G06T 7/20 382/103 |
| 2015/0091900 | A1* | 4/2015 | Yang | G06T 15/205 345/419 |
| 2015/0310281 | A1* | 10/2015 | Zhu | G05D 1/0246 382/104 |
| 2018/0241941 | A1 | 8/2018 | Okada | |
| 2021/0295065 | A1 | 9/2021 | Arai et al. | |
| 2023/0179841 | A1 | 6/2023 | Itaba et al. | |
| 2026/0072165 | A1* | 3/2026 | Takahata | G01S 17/18 |

FOREIGN PATENT DOCUMENTS

| | | | |
|---|---|---|---|
| JP | 2017-224970 | A | 12/2017 |
| WO | 2020/121973 | A1 | 6/2020 |
| WO | 2020/184447 | A1 | 9/2020 |

* cited by examiner

IMAGE PROCESSING METHOD AND IMAGE PROCESSING DEVICE

CROSS-REFERENCE TO RELATED APPLICATIONS

This application is the U.S. National Phase under 35 U.S.C. § 371 of International Patent Application No. PCT/JP2023/011585, filed on Mar. 23, 2023, which in turn claims the benefit of Japanese Patent Application No. 2022-057329, filed on Mar. 30, 2022, the entire disclosures of which Applications are incorporated by reference herein.

BACKGROUND

The present disclosure relates to an image processing method and an image processing device.

Japanese Unexamined Patent Publication No. 2017-224970 describes a configuration of an image processing device having an image processing unit that, for prevention of frame dropping at the transmission of high-resolution or high-frame-rate moving images, divides an image region of a given image into at least two regions based on distance information obtained by a distance-measuring sensor and executes image processing for at least one of the two regions of the image so that the two regions be different in image quality from each other.

In the image processing device of the cited patent document, an attention region designated by the user is identified from position information of an image designated by the user and distance information measured by the distance-measuring sensor. Specifically, an object region having same distance information is detected in the neighborhood of the position designated by the user, and the detected region is determined to be the attention region.

However, the technique of the cited patent document, in which input by the user is a precondition, has a problem that the image processing of making two regions different in image quality cannot be performed automatically.

Also, in the search of the distance information (distance image) from the distance-measuring sensor, for example, it is necessary to assign a search window size because the distance image is an image in which gray-scaled distance values are present in a mixed manner. Also, for the search with the distance image, matching with a 3D model is performed and this complicates the processing, causing a problem that the processing speed becomes low.

In view of the above problems, an objective of the present disclosure is extracting an image region of a detection target automatically at high speed.

SUMMARY

In order to solve the above problems, an image processing method using an image processing device according to one mode of the present disclosure includes: first processing of acquiring a range gate image using a range gate imaging device that captures an image of a set distance range for a predetermined capture area; second processing of searching for a detection target in the range gate image using a search window having a size corresponding to a capture distance from the range gate imaging device to the set distance range; and third processing of synthesizing, when a window region satisfying a predetermined condition is detected in the range gate image in the second processing, object information included in the window region and a grayscale image acquired using a grayscale imaging device that captures a grayscale image of the predetermined capture area and outputting the result.

According to the present disclosure, since a search window having a size corresponding the capture distance is used, it is possible to avoid wasteful search caused by using a search window size that does not match with the size of the detection target. Also, since the range gate image is substantially a binary image and therefore the calculation amount of the search processing is small compared with a grayscale image, the image region of the detection target can be extracted automatically at high speed.

DETAILED DESCRIPTION

Embodiments of the present disclosure will be described hereinafter in detail with reference to the accompanying drawings. Note that description of the embodiments to follow is essentially a mere illustration and by no means intended to restrict the present invention, applications thereof, or uses thereof. That is, numerical values, shapes, components, disposed positions and connecting styles of the components, and the like shown in the embodiments below are examples and by no means purport to limit the present disclosure. Therefore, among components in the embodiments below, a component that is not described in an independent claim representing a highest concept of the present disclosure will be described as an optional component.

First Embodiment

Figure 1:
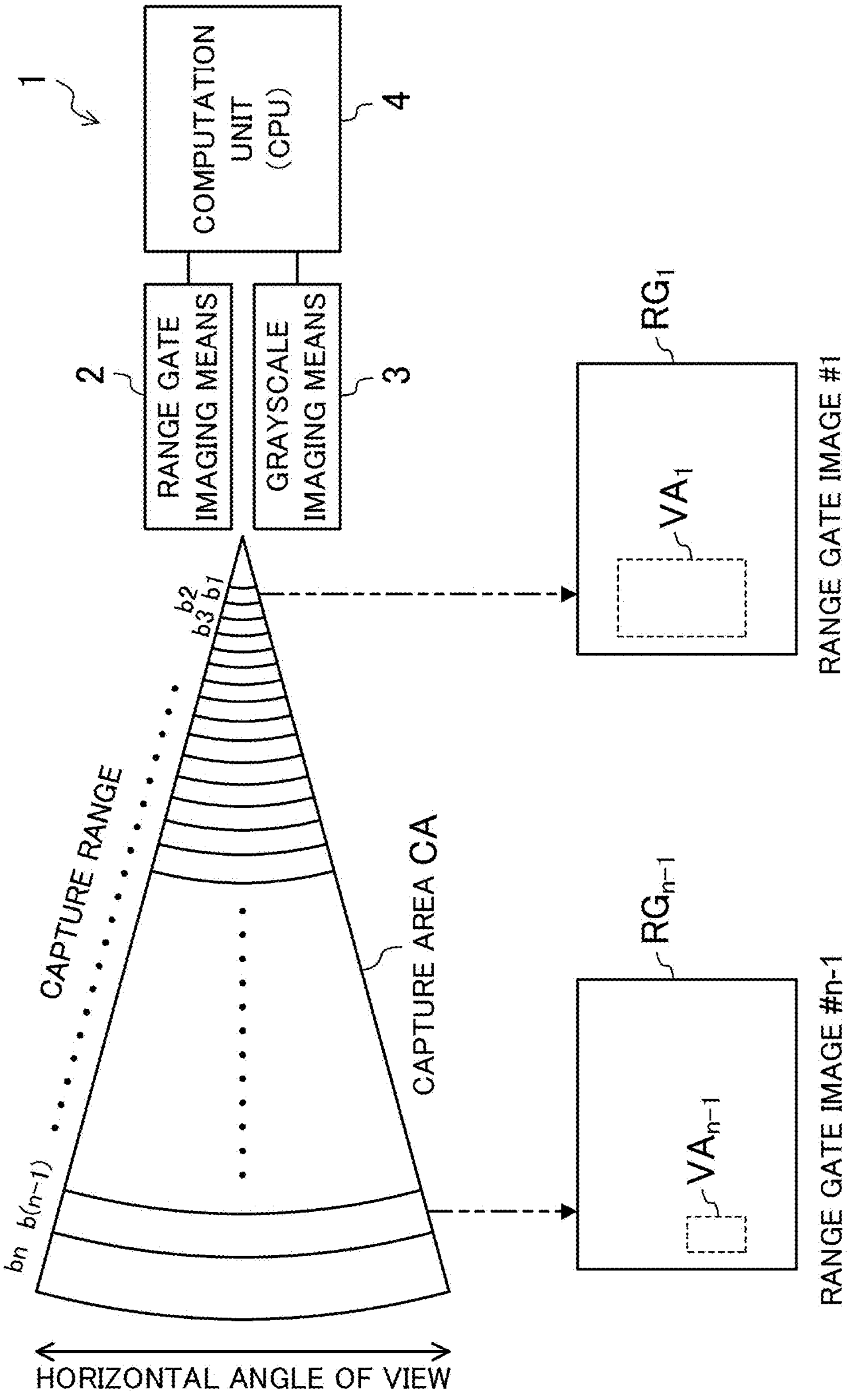
FIG. 1 is a schematic view showing a configuration of an image processing device, a capture area, and a search window.
Figure 2:
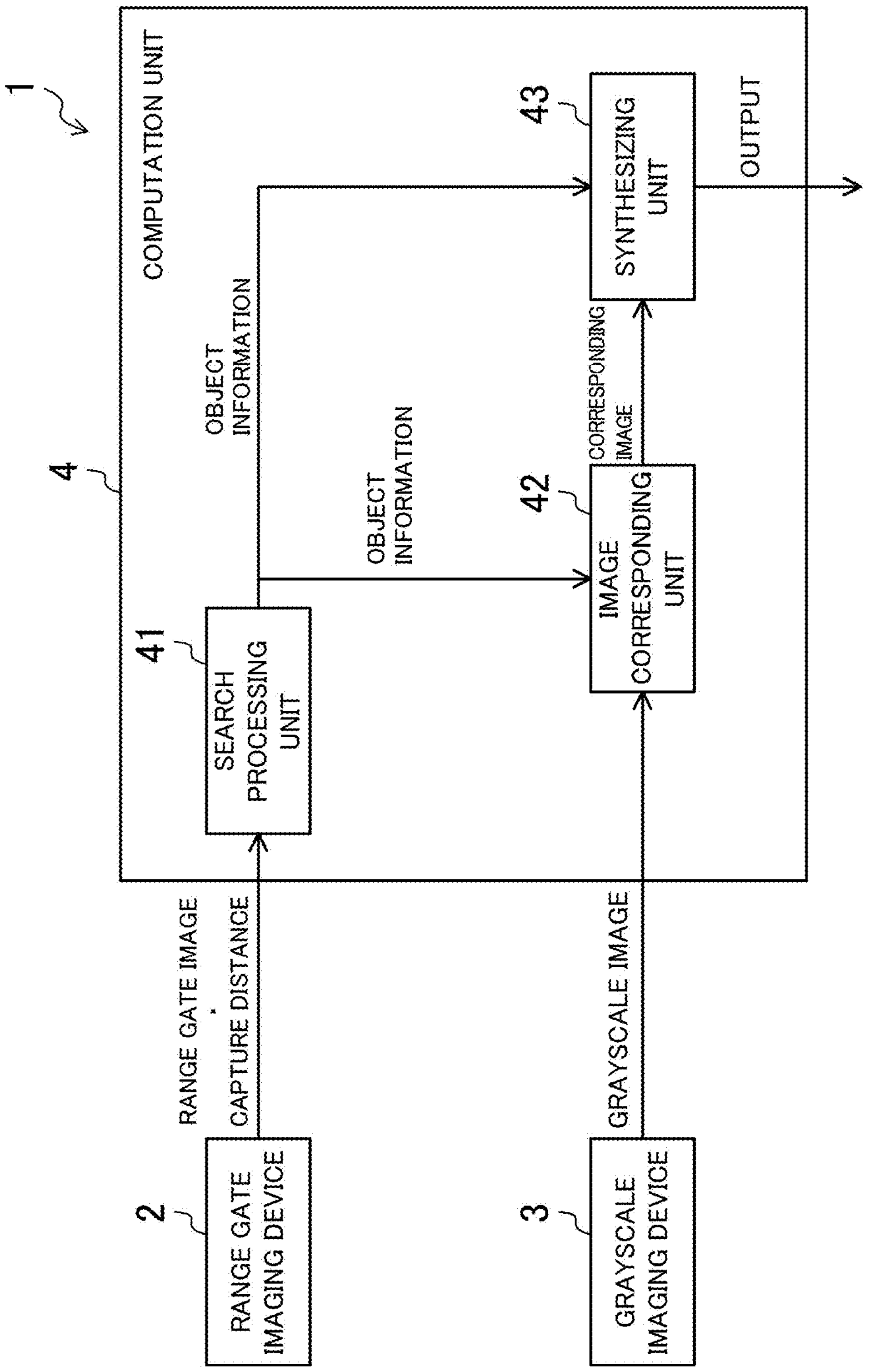
FIG. 2 is a block diagram showing a configuration example of the image processing device.

FIG. 1 is a schematic view showing outlines of a configuration of an image processing device of this embodiment, a capture area, and a search window. FIG. 2 is a block diagram showing a configuration example of the image processing device.

As shown in FIG. 1, an image processing device 1 includes a range gate imaging device 2, a grayscale imaging device 3, and a computation unit 4. The image processing device 1 of the present disclosure is used for uses such as the following: in the case of work by a robot in a factory, for example, when a detection target M is approaching on a belt conveyer, the position of the detection target M is grasped from a range gate image RG captured by the range gate imaging device 2, and a region including the detection target is cut out from a grayscale image captured by the grayscale imaging device 3 based on the position information and output. Information output from the image processing device 1 is used for later-stage processing (e.g., image recognition processing) and the like.

—Range Gate Imaging Device—

The range gate imaging device 2 captures a range gate image RG in a set distance range (hereinafter called a capture range b) for a predetermined capture area CA. The range gate imaging device 2 outputs a range gate image RG captured for each capture range b and information of a capture distance S to the computation unit 4.

A plurality of capture ranges b can be set, and the number of capture ranges b is herein called the number of ranges and denoted by n, where n is an arbitrary number equal to or greater than 1. For convenience of description, the n-th capture range b is herein indicated by the capture range $b_n$ in some cases. Note that, for the capture distance S, the range gate image RG, and a search window VA to follow, also, symbols are attached in a similar rule in some cases.

Figure 3A:
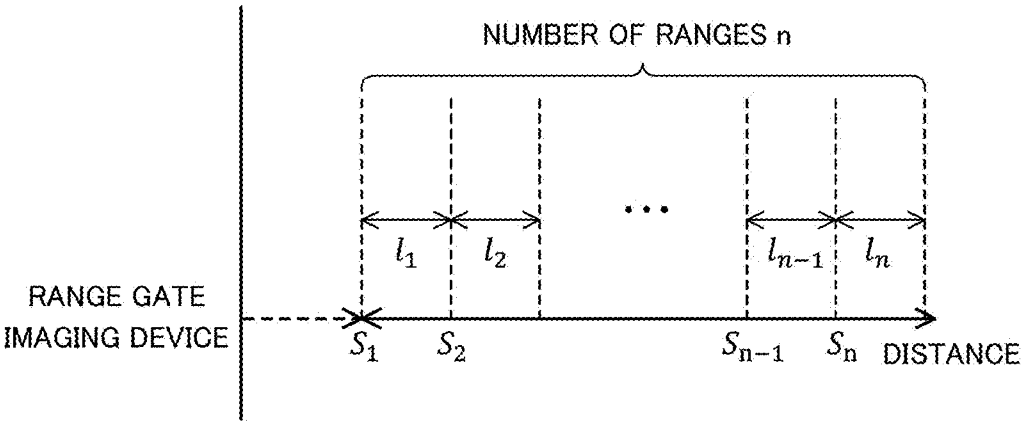
FIG. 3A is a view showing an example of the relationship between the number of ranges and the capture distance.
Figure 3B:
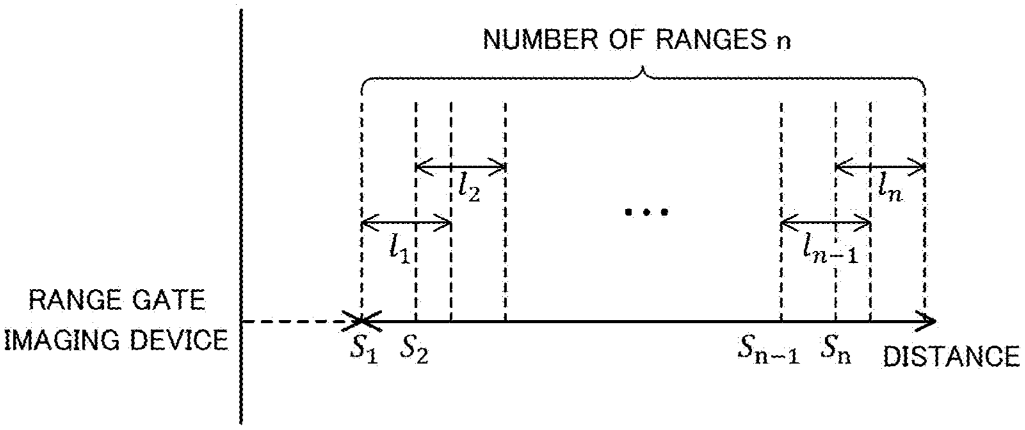
FIG. 3B is a view showing another example of the relationship between the number of ranges and the capture distance.
Figure 3C:
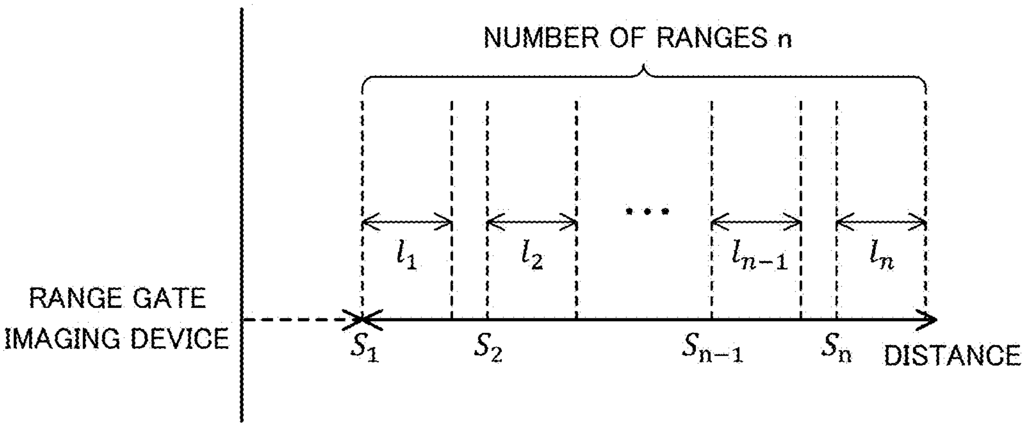
FIG. 3C is a view showing yet another example of the relationship between the number of ranges and the capture distance.

FIGS. 3A-3C show examples of the relationship between the number of ranges n of the range gates and the capture distance S. The capture distance S is a distance from the range gate imaging device 2 to each capture range b. In the examples of FIGS. 3A-3C, the distances from the range gate imaging device 2 to the start positions of the capture ranges $b_1$ to $b_n$ are respectively indicated by the capture distances $S_1$ to $S_n$. Note that the capture distance S is not limited to the distance to the start position of each range, but may be the distance to the intermediate position of the range.

In FIGS. 3A-3C, for example, the capture distance $S_1$ of the first range is the distance from the range gate imaging device 2 to the start position of the first range, and the span (length) from the start position to the end position of the capture range $b_1$ is $l_1$. Similarly, the capture distance $S_2$ of the second range is the distance from the range gate imaging device 2 to the start position of the second range, and the span of the capture range $b_2$ is $l_2$. The capture distance $S_n$ of the n-th range is the distance from the range gate imaging device 2 to the start position of the n-th range, and the span of the capture range $b_n$ is $l_n$.

Note that in the examples of FIGS. 3A-3C, the spans $l_1$, $l_2$, . . . , $l_n$ are all the same, but the spans l may be different from one another.

FIG. 3A shows an example in which n capture ranges b are arranged with their spans l in the depth direction of the capture area CA equal to each other and with no gap between the adjacent capture ranges b.

FIG. 3B shows an example in which the capture ranges b have overlap regions with their preceding and following ranges b in the depth direction of the capture area CA. The setting of FIG. 3B is useful in cases such as a case when an object astride a plurality of ranges is determined to be one object.

FIG. 3C shows an example in which non-imaging regions, i.e., regions in which no image is captured, are set between each capture range b and its preceding and following ranges b in the depth direction of the capture area CA. The setting of FIG. 3C is useful in cases such as one when the ranges observed are fixed, e.g., when only the vicinity of each train door is monitored on a platform of a station.

Figure 4:
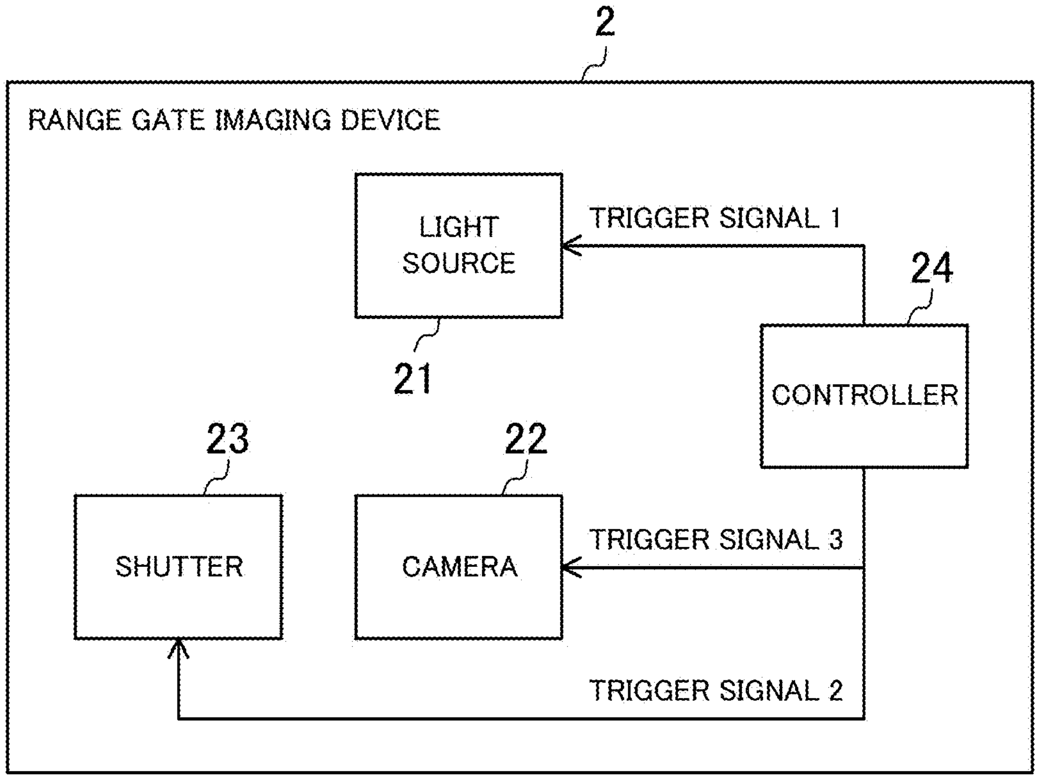
FIG. 4 is a block diagram showing a configuration example of a range gate imaging device.

FIG. 4 shows a configuration example of the range gate imaging device 2. As shown in FIG. 4, the range gate imaging device 2 includes a light source 21, a camera 22, a shutter 23, and a controller 24. The range gate imaging device 2 is configured to perform light exposure at a time delayed from the time of illumination of pulse light from the light source 21. The distance by which light goes and returns in the delay time is to be the capture distance S of the distance range (capture range b) taken in the range gate image RG. Also, the distance by which light goes and returns in the exposure time is to be the span 1 of the distance range (capture range b) taken in the range gate image RG.

Note that the configuration of the range gate imaging device 2 is not limited to that of FIG. 4, but any other conventionally known range gate imaging device may be used.

The controller 24 outputs a trigger signal 1, a trigger signal 2, and a trigger signal 3 responsive to the capture range b to be imaged. The distance by which light goes and returns in the delay time of the trigger signal 2 with respect to the trigger signal 1 is to be the capture distance S.

The light source 21, which is a pulse light source, radiates light responsive to the capture range b to be imaged to the capture area CA based on the trigger signal 1 received from the controller 24.

The shutter 23 is a global shutter that opens/closes based on the trigger signal 2 received from the controller 24. Examples of the shutter 23 include a global electronic shutter, a mechanical shutter, and a liquid crystal shutter.

The camera 22 captures the range gate image RG based on the trigger signal 3 received from the controller 24. As an imaging element of the camera 22, a high-sensitivity sensor such as an avalanche photodiode is used.

The range gate image RG is an image corresponding to the distance between the range gate imaging device 2 and an object to be imaged (the distance corresponds to the delay amount of the light exposure with respect to the light source 21 at the time of imaging by the range gate imaging device 2). The range gate image RG is rough in texture since the light exposure time is short. The light exposure time is 66.7 ns for a distance range of 100 m, for example. The range gate image RG includes background texture information.

Figure 12:
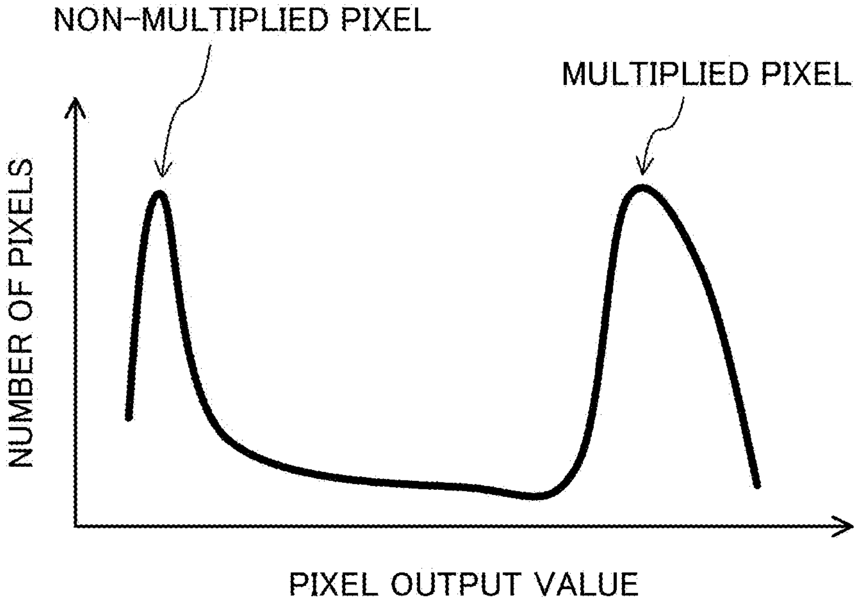
FIG. 12 is a view for explaining a binary image (binary-like image)

In other words, the range gate image RG is a substantial binary image. To state specifically, the range gate imaging device 2 performs such processing as to emit light to each capture range b and cut out the timing of return of the light. Therefore, the shutter time is very short. In addition, a high-sensitivity sensor such as an avalanche photodiode is used as described above. As a result, the image captured by the range gate imaging device 2 is a binary-like image. The binary-like image as used herein includes an image in which a histogram of pixel values is polarized. For example, in imaging using an avalanche photodiode, obtained is a histogram polarized into multiplied pixels and non-multiplied pixels as shown in FIG. 12. Also, the binary-like image includes a grayscale image of the order of several bits. That is, it is assumed herein that the binary image is an image that appears to be significantly small in the number of grayscale levels compared with normal grayscale images. Specifically, it is assumed that the term "binary image" is used herein as a concept including the above-described binary-like images (an image having a polarized histogram and a grayscale image of the order of several bits) in addition to a complete binary image. To state further differently, the binary image as used herein includes a concept of being an image that can be easily binarized in the case of determining whether there is a pixel or not in each pixel region.

—Grayscale Imaging Device—

Referring back to FIG. 1, the grayscale imaging device 3 is an imaging device that captures a grayscale image using background light in the predetermined capture area CA. The imaging device used as the grayscale imaging device 3 is not specifically limited, but may be a texture imaging device capturing a texture image, a general imaging device such as a digital camera capturing a visible light image (an imaging device using a CMOS sensor or a CCD sensor), an X-ray camera, or a thermo-camera. The grayscale imaging device 3 outputs the captured grayscale image to the computation unit 4.

The predetermined capture area CA mentioned above indicates that the same capture area as that of the range gate imaging device 2 is used. Note however that this does not indicate that the capture ranges of the range gate imaging device 2 and the capture ranges of the grayscale imaging device 3 are the same. In other words, only required is that the range gate imaging device 2 and the grayscale imaging device 3 be configured to capture the common capture area CA, and their capture ranges may be different from each other.

—Computation Unit—

The computation unit 4 synthesizes object information obtained by searching the range gate image RG received from the range gate imaging device 2 and image information corresponding to the object information in the grayscale image received from the grayscale imaging device 3.

As shown in FIG. 2, the computation unit 4 includes a search processing unit 41, an image corresponding unit 42, and a synthesizing unit 43.

[Search Processing Unit]

The search processing unit 41 searches for a detection target in the range gate image RG using a search window VA having a size corresponding to the capture distance S, and outputs object information detected by the search.

FIG. 1 illustrates a search window $VA_1$ set in a range gate image $RG_1$ in the first range $b_1$ and a search window $VA_{n-1}$ set in a range gate image $RG_{n-1}$ in the (n−1)th range $b_{n-1}$. In this way, in this embodiment, the size of the search window VA is changed with the capture distance S corresponding to the range gate image RG, and search in the range gate image RG is performed for each image. Specifically, as the capture distance S is longer, the size of the search window VA becomes gradually smaller.

The method of setting the size (horizontal size and vertical size) of an object to be detected (hereinafter simply called the detection target) using the search window VA is not specifically limited. For example, (1) one or a plurality of default values may be set as a preset value, (2) the user may designate the size of the search window VA during or before operation of the image processing device, or (3) the size may be adjusted automatically. Also, these setting methods (1) to (3) may be combined. In the setting method (2), in designating the size of the search window VA by the user, a method of designating a specific numerical value and a method of selecting one from several options are exemplified.

As for the setting method (3) of automatic adjustment, also, no concrete setting method is specified, but the following two methods are exemplified.

As the first method, for example, the range gate image RG in a predetermined capture range b is captured using the range gate imaging device 2. Thereafter, the size of the search window VA in the range gate image RG is assigned and search is performed. From the relationship between the size of the detected object on the image and the distance of the range gate image RG, the size of the object in each range gate image RG is calculated.

As the second method, for example, the range gate image RG in a predetermined capture range b is captured using the range gate imaging device 2, and a grayscale image is captured using the grayscale imaging device 3. Edge extraction (planar differential processing) of the grayscale image is performed. The range gate image RG in the predetermined capture range b is compared with the edge-extracted image, and a region in which the same edge is obtained in both images is determined to be the region of the object. From the capture distance S of the corresponding range gate image RG and the size of the region of the object on the range gate image RG, the size of the object is calculated.

The size of the search window VA is then set based on the relationship between the size of the detection target set as described above and the capture distance S. In this case, the size of the search window VA may be set considering a shadow formed by the light source 21 of the range gate imaging device 2.

An effect obtained by using a search window having a size corresponding to the capture distance as described above will be described.

When the number of pixels of an image is H horizontally and V vertically and the detection target is captured at N stages of distance, the search window size matching with the detection target at each stage is assumed to be $H_{ROI}(k)$ horizontally and $V_{ROI}(k)$ vertically (k=1 to N).

When performing total search while assigning the search window size with only a texture image as conventionally done, the image must be searched totally for each window size and therefore the number of times of search will be as follows.

$$\sum_{k=1}^{N}(H - H_{ROI}(k))(V - V_{ROI}(k))$$

In contrast to the above, in scanning of each range gate image, only an object present in the distance range corresponding to the range gate image is to be captured in the range gate image. Therefore, it is only required to search a range of $H_{EX}$ pixels in the horizontal direction and $V_{EX}$ pixels in the vertical direction set as the search window size for the region in which the object is captured for each range gate image. The number of times of search is therefore as follows.

$$\sum_{k=1}^{N} 2H_{EX} * 2V_{EX}$$

Note that the region in which the object is captured can be determined by barycenter calculation of each range gate image.

Assuming that H=640, V=480, N=3, $H_{ROI}(k)$=240, 120, 80, $V_{ROI}(k)$=180, 90, 60, $H_{EX}$=10, and $V_{EX}$=10, for example, while 558,000 times of search are required in the conventional technique, the number of times of search can be reduced to 1,200 in the present technique.

[Image Corresponding Unit]

Based on the grayscale image captured by the grayscale imaging device 3 and the object information output from the search processing unit 41, the image corresponding unit 42 outputs image information (hereinafter also called "corresponding image information") corresponding to the object information. The corresponding image information is a cutout image obtained by cutting out the object information (including the surroundings of the object information) from the grayscale image or a background image excluding the object information, for example.

To state specifically, the image corresponding unit 42 calculates a homography matrix from the image by the range gate imaging unit 2 to the image by the grayscale imaging unit 3 based on optical and mechanical design parameters, and acquires the corresponding image information (texture information when a texture imaging device is used) using the homography matrix.

The homography matrix as used herein is a matrix defining, when a point on the plane in a given space is captured by two different cameras, on which coordinates the coordinate information of the point captured by one of the cameras should be projected of the coordinate system of the other camera. Note that calibration for the homography matrix should be performed in advance.

The image corresponding unit 42 cuts out or cut off an image from the grayscale image for a region expanded by several pixels in the upper, lower, left, and right directions from the object information output from the search processing unit 41 (hereinafter such a region is called an expanded region) based on the calculation of the homography matrix described above, thereby generating the corresponding image information (texture information when a texture imaging device is used). Note that an image may be cut out or cut off from the grayscale image based on the object information without setting the expanded region.

Figure 10:
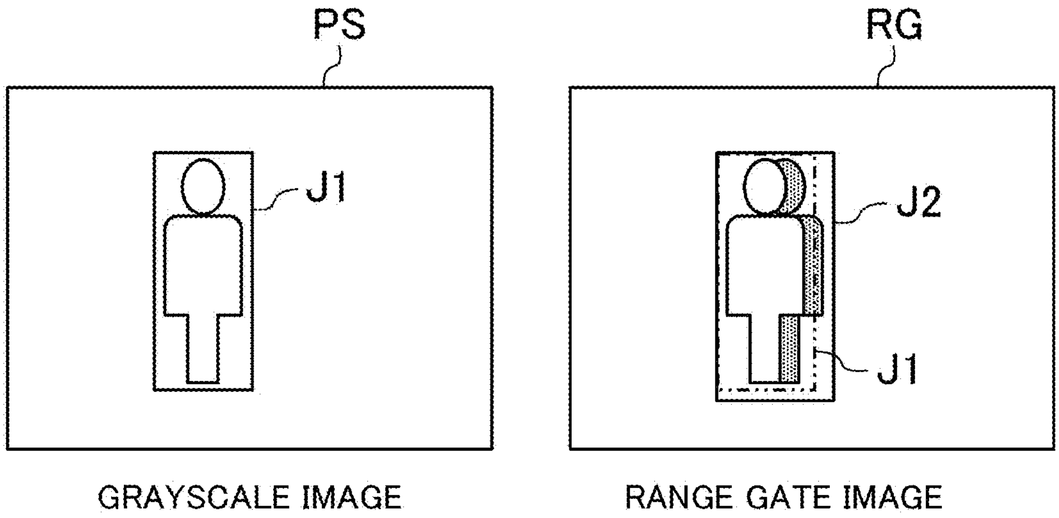
FIG. 10 is a conceptual view showing a setting example of a search window.

The expanded region may be further expanded in the direction in which a shadow is formed by the light source 21 of the range gate imaging device 2 as shown in FIG. 10. To state more specifically, the image corresponding unit 42 estimates a region (shadow region) of the shadow formed for the detection target M by the light source 21 based on at least either the positional relationship between the light source 21 and the camera 22 or the capture distance S, and further expands the expanded region according to the shadow region. In FIG. 10, the shadow region is dot-hatched, and the cutout region first set by the image corresponding unit 42 is indicated by J1 and the cutout region expanded in the direction of the shadow by the light source 21 is indicated by J2. The method of estimating the shadow region by the image corresponding unit 42 is not specifically limited, but, for example, the shadow region may be estimated by adding thickness information of the detection target, or may be estimated based on the capture distance S at which the target range gate image RG has been captured.

[Synthesizing Unit]

The synthesizing unit 43 associates the object information output from the search processing unit 41 with the corresponding image information output from the image corresponding unit 42 and outputs the results. Specifically, the synthesizing unit 43 executes (1) processing of storing texture information (image), region information (numerical value), and distance information (numerical value) in each pixel of one image, and (2) processing of integrating the texture information of the range gate image RG and the texture information of the grayscale image. As an example of the processing (2), the range gate image captured using ultrared light and color information of the grayscale image captured using visible light may be interpolated. The results of the processing (1) and (2) are output to a later-stage circuit (program).

The output of the synthesizing unit 43 is used for the later-stage processing (e.g., image recognition processing) and the like. Note that, in this embodiment, the function of the synthesizing processing unit is implemented by the image corresponding unit 42 and the synthesizing unit 43, although the method of implementing the function of the synthesizing processing unit is not limited to this configuration.

—Operation of Image Processing Device—

Figure 5:
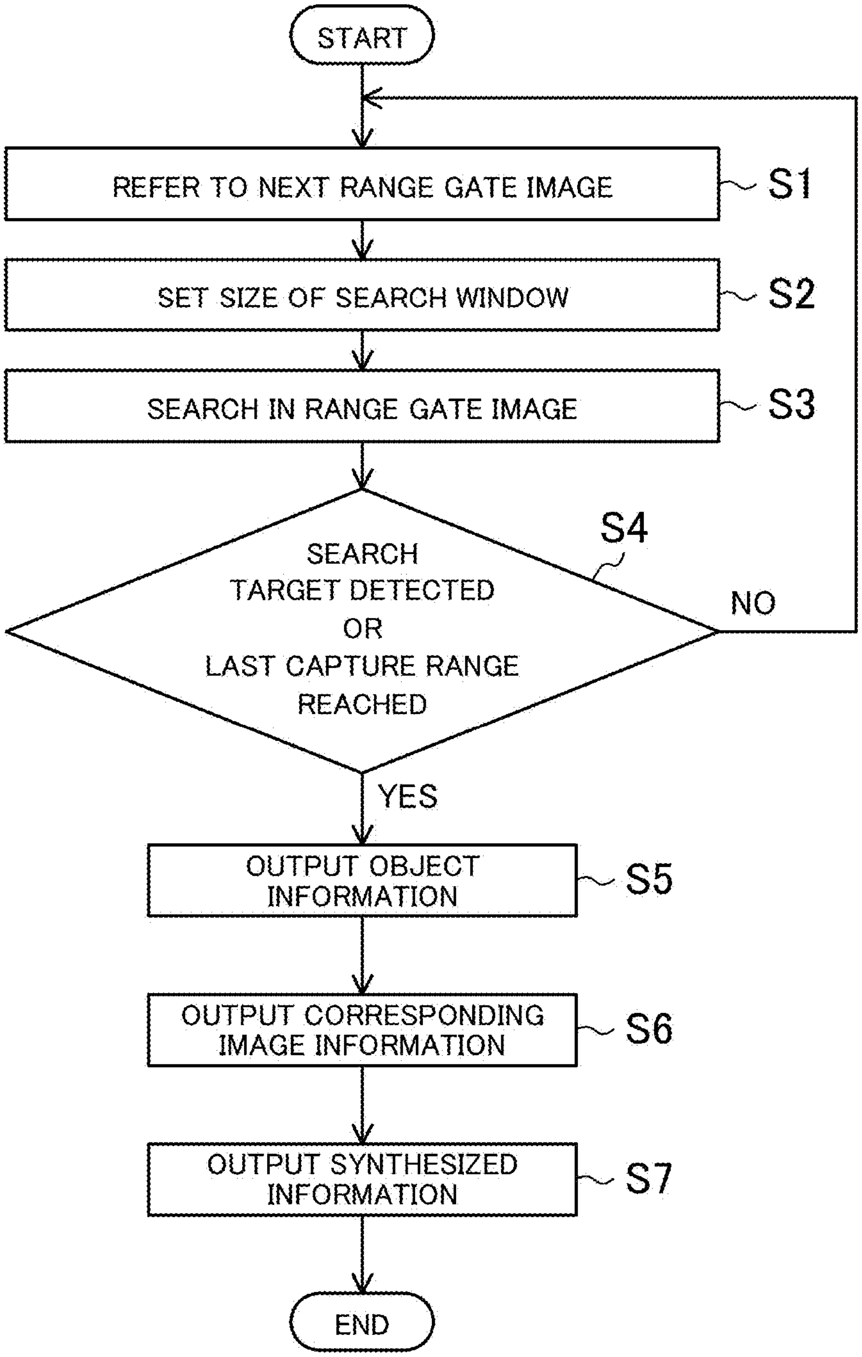
FIG. 5 is a flowchart showing an operation example of the image processing device.
Figure 6:
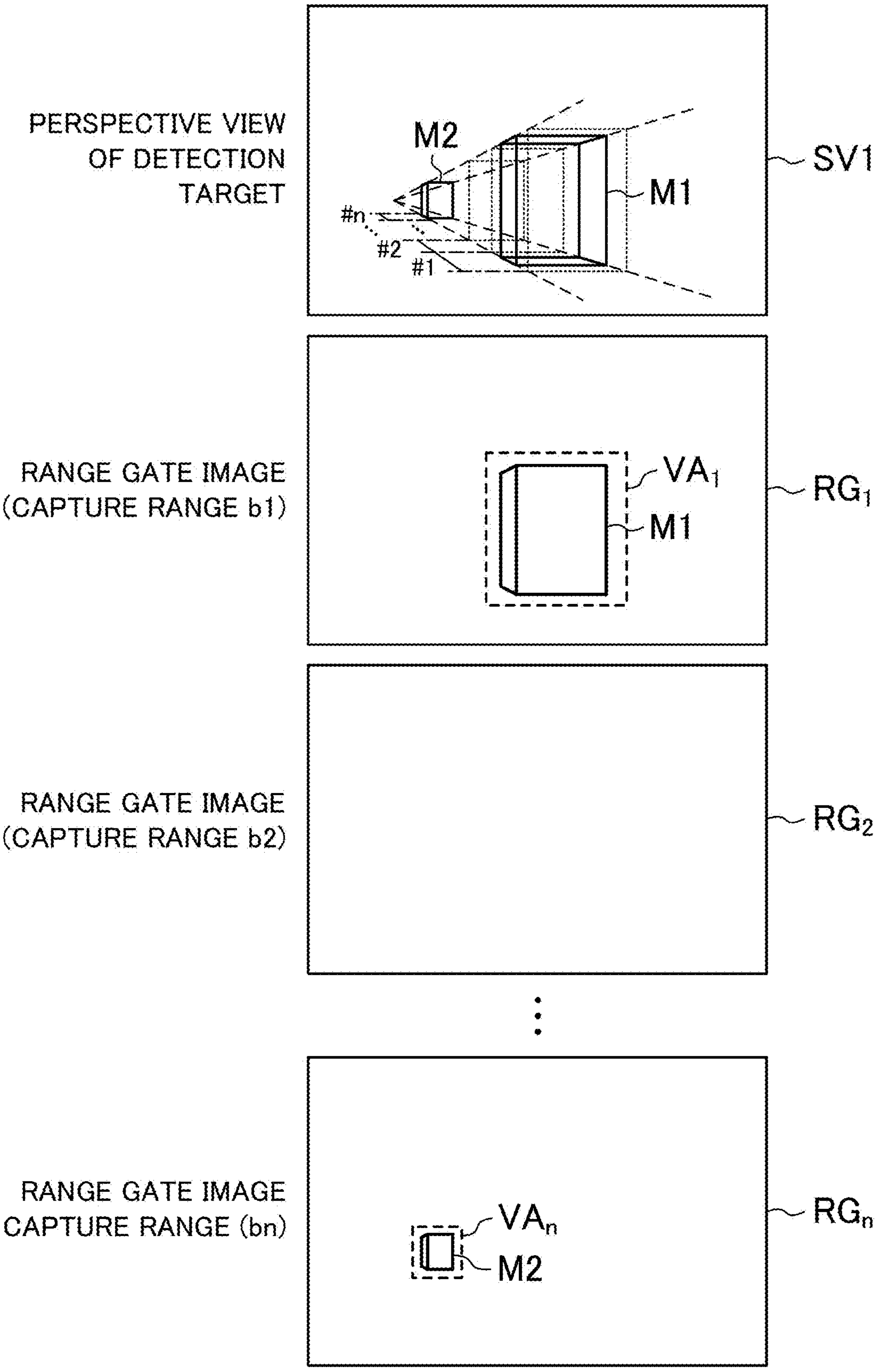
FIG. 6 illustrates an operation example of an image processing device of the first embodiment.

The operation of the image processing device and the image processing method according to the present disclosure will be described hereinafter with reference to FIG. 5. Assume herein that, as shown in FIG. 6, the detection target M is a rectangular solid and in a state of SV1 in FIG. 6.

—Step S1—

In step S1, the search processing unit 41 refers to the range gate image RG in the set capture range b. For example, at the start of the processing, the range gate image $RG_1$ in the first range $b_1$ is acquired using the range gate imaging device 2, and the search processing unit 41 refers to the range gate image $RG_1$. Note that, at this time, range gate images RG in a plurality of capture ranges b may be acquired at a time from the range gate imaging device 2.

—Step S2—

In step S2, the search processing unit 41 sets the size of the search window VA. At this time, the search window $VA_1$ is set for the range gate image $RG_1$ in the first range $b_1$. The method of setting the search window $VA_1$ is not specifically limited, but, for example, the size of the detection target using the search window $VA_1$ is set, and the size of the search window $VA_1$ is set based on the relationship between the size of the detection target and the capture distance S. Since the size setting of the detection target has been already described, detailed description thereof is omitted here.

—Step S3—

In step S3, the search processing unit 41 searches for a window region satisfying a predetermined condition in the range gate image RG using the search window VA. More specifically, the search processing unit 41 determines whether or not object information satisfying a predetermined condition can be obtained. For example, whether or not a captured object in the window region of the range gate image RG is the detection target M is determined from the relationship between the size of the captured object and the capture distance S. As shown in FIG. 6, if there is a position for the search window VA satisfying a predetermined condition in the range gate image RG, the position is specified as the window region in which the detection target is present (see $RG_1$ in FIG. 6). The processing from step S1 through step S3 corresponds to the first processing and the second processing.

—Step S4—

In step S4, the search processing unit 41 determines whether or not the detection target has been detected or whether or not the search has reached the last capture range b. For example, when there is one detection target, the determination is YES, and when there are two or more detection targets, the determination is NO. If YES, the flow proceeds to step S5. If NO, the flow returns to step S1 and the processing from S1 through S4 is repeated. Assume here that there are two detection targets, the processing from S1 through S4 has been repeated, and objects M1 and M2 have been detected.

—Step S5—

In step S5, the search processing unit 41 outputs the object information. In this example, the search processing unit 41 outputs information of the objects M1 and M2 as the object information.

The object information output from the search processing unit 41 includes at least either pixel information of the objects M1 and M2 detected as the detection targets M captured in window regions satisfying a predetermined condition in the search in the respective range gate images RG, or information of rectangular regions in which these objects are inscribed.

The pixel information of the objects M1 and M2 includes coordinate information of pixels in which the objects M1 and M2 are present or coordinate information of contour pixels in regions in which the objects M1 and M2 are present. The information of rectangular regions in which the objects M1 and M2 are inscribed includes the coordinates of any of four corners or the center of the rectangular region and size information (the numbers of pixels in the horizontal and vertical directions) of the rectangular region. Also, as the object information, information of the capture distance S of the window region satisfying a predetermined condition may be included. In the example of FIG. 6, as the object information, in addition to the pixel information or the rectangular region information described above, information of the capture distance $S_1$ at which the object M1 has been detected and the capture distance $S_n$ at which the object M2 has been detected are output.

—Step S6—

In step S6, the image corresponding unit 42 outputs corresponding image information based on the grayscale image captured by the grayscale imaging device 3 and the object information output from the search processing unit 41.

Specifically, the image corresponding unit 42 generates the corresponding image information by cutting out or cutting off an image of the expanded region related to the object information from the grayscale information on the basis of the calculation of the homography matrix described above, and outputs the generated information.

—Step S7—

In step S7, the synthesizing unit 43 associates the object information output from the search processing unit 41 with the corresponding image information output from the image corresponding unit 42, and outputs the results. Specifically, the synthesizing unit 43 executes processing of storing texture information, region information, and distance information in each pixel of one image, and processing of integrating the texture information of the range gate image RG and the texture information of the grayscale image, and outputs the results to a later-stage circuit (program).

As described above, according to this embodiment, since a search window having a size corresponding to the capture distance S at the range gate imaging device 2 is used, it is possible to avoid wasteful search caused by using a search window size that does not match with the size of the detection target M. Also, since the range gate image RG is substantially a binary image as described above, the calculation amount of the search processing can be small compared with the grayscale image captured by the grayscale imaging device 3. Therefore, the image region of the detection target can be extracted automatically at high speed.

—Alteration (1)—

Figure 7:
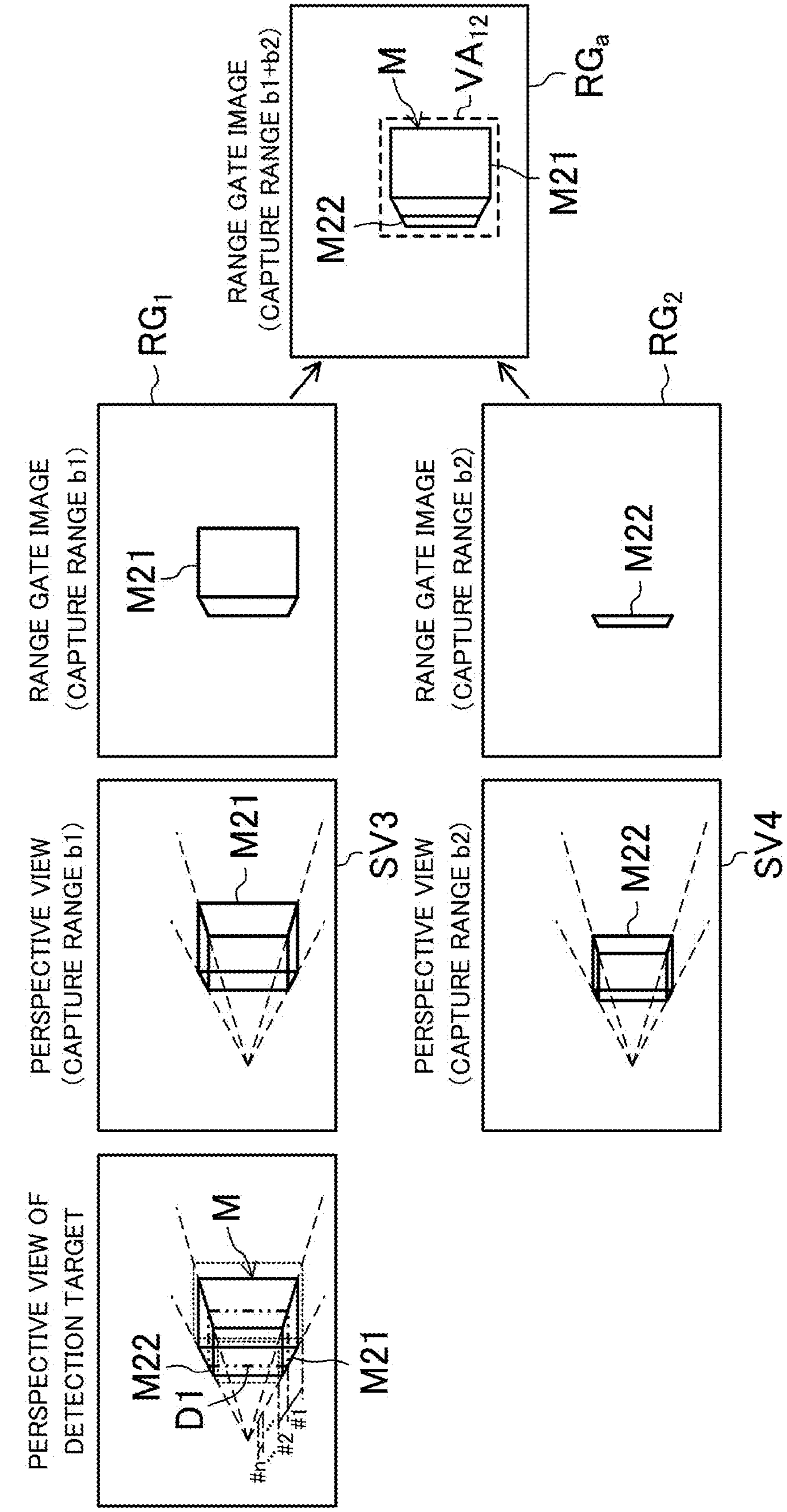
FIG. 7 illustrates another operation example of the image processing device.

FIG. 7 shows an example in which the boundary between the first range $b_1$ and the second range $b_2$ is located at a middle position of the detection target M, i.e., the detection target M lies astride the first range $b_1$ and the second range $b_2$. In such a case, by superimposing two adjacent range gate images RG on each other, an integrally continuous object is detected. That is, a continuous image is obtained in mutually adjacent regions on the range gate images RG.

To respond to such a case as in FIG. 7, at the time of referring to the range gate image RG in step S1, the search processing unit 41 may be made to refer to range gate images RG adjacent in the front-back direction, for example. When images of an integrally continuous object have been detected in range gate images RG in capture ranges b adjacent in the front-back direction, for example, an image obtained by performing logical OR of these range gate images may be used in the processing of step S3.

For example, in the example of FIG. 7, an object M21 detected on the range gate image $RG_1$ in the first range $b_1$ and an object M22 detected on the range gate image $RG_2$ in the second range $b_2$ have their boundaries same in length and are shaped to be continuous to each other when superimposed on each other. Therefore, an image $RG_a$ obtained by performing logical OR of the range gate images $RG_1$ and $RG_2$ is used, and search using a search window $VA_{12}$ is executed in step S3. The other operation is similar to that in the above embodiment, and similar effects are obtained.

—Alteration (2)—

Figure 8:
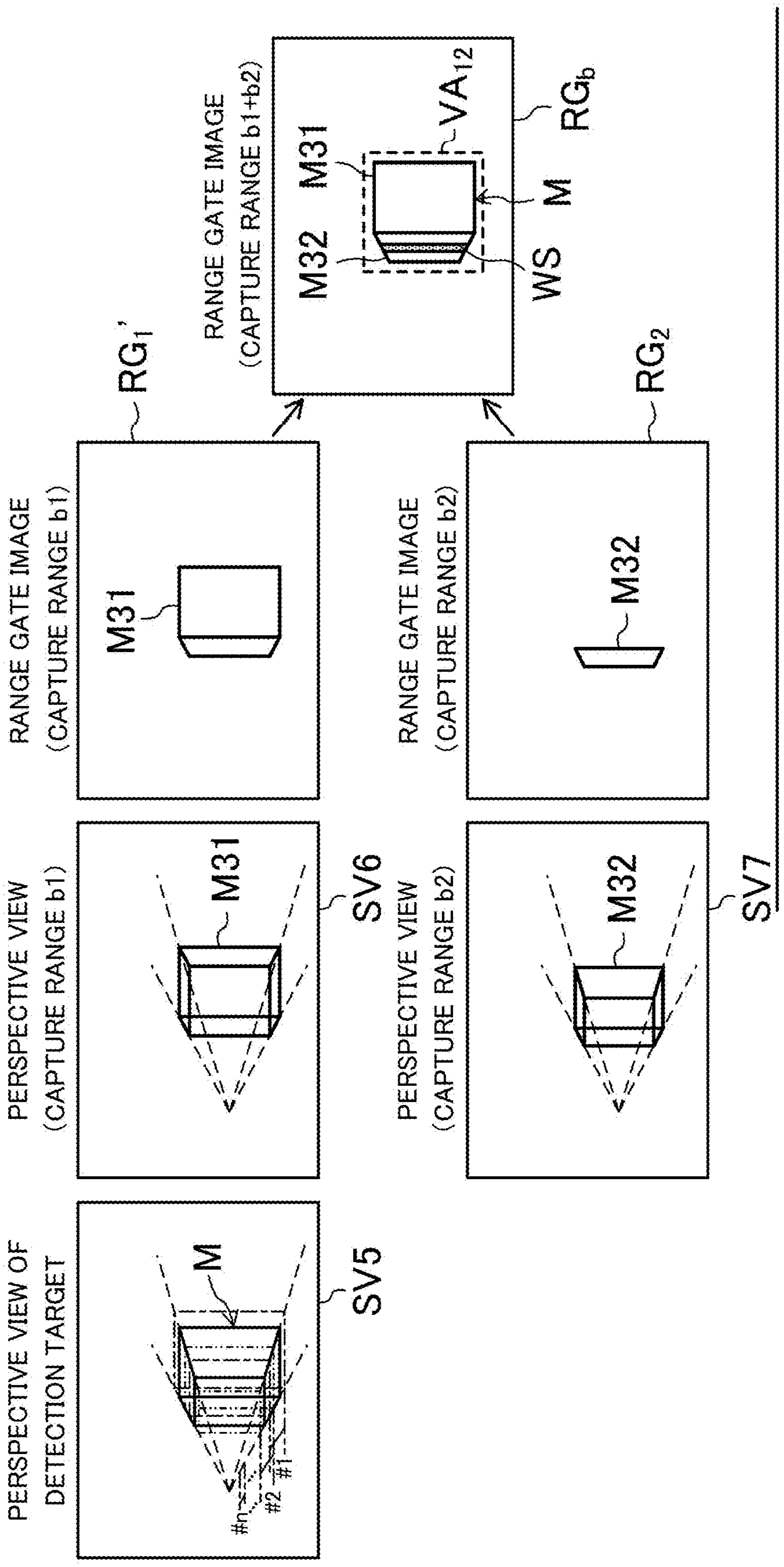
FIG. 8 illustrates an operation example corresponding to FIG. 3B of the image processing device.

FIG. 8 shows an operation example in the case where the capture ranges b have overlap regions with their adjacent ranges in the depth direction of the capture area CA as shown in FIG. 3B. In this example of FIG. 8, also, as in the example of FIG. 7, the detection target M is captured to be astride the boundary between the first range $b_1$ and the second range $b_2$. In such a case, an object M having an overlap region WS overlapping between adjacent range gate images RG is detected in these range gate images RG.

To respond to the above case, also, at the time of referring to the range gate image RG in step S1, the search processing unit 41 may be made to refer to range gate images RG adjacent in the front-back direction. When image regions of range gate images RG in capture ranges b adjacent in the front-back direction overlap each other, for example, it is determined that the regions include the same object, and an image obtained by performing logical OR of these range gate images may be used in the processing of step S3.

For example, in the example of FIG. 8, there is an overlap region WS between an object M31 detected on the range gate image $RG_1$ and an object M32 detected on the range gate image $RG_2$. Therefore, an image $RG_b$ obtained by performing logical OR of the range gate images $RG_1$ and $RG_2$ is used, and search using a search window $VA_{12}$ is executed in step S3. The other operation is similar to that in the above embodiment, and similar effects are obtained.

—Alteration (3)—

Figure 9:
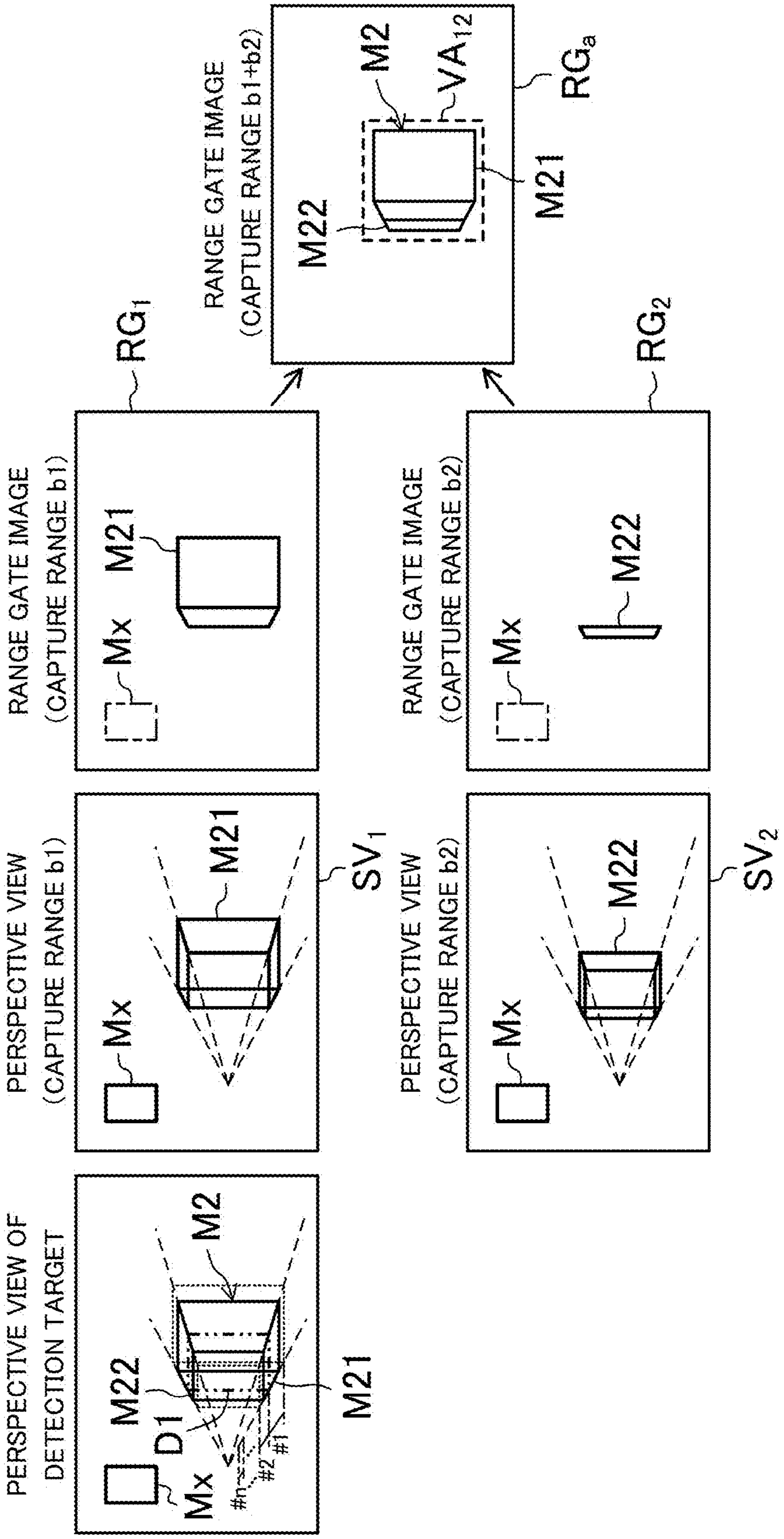
FIG. 9 illustrates yet another operation example of the image processing device.

FIG. 9 shows an example in which a static object Mx is captured aside from the detection target M. The static object Mx is supposed to be a fixture in a factory, a structure fixed to a wall or a facility, or the like. In such a case, the object Mx is supposed to be captured in common in the first range $b_1$ and the second range $b_2$.

To respond to such a case as in FIG. 9, at the time of referring to the range gate image RG in step S1, the search processing unit 41 may be made to refer to range gate images RG adjacent in the front-back direction. When a common static object Mx is detected on range gate images RG in a plurality of (a predetermined threshold or more) capture ranges b continuous in the front-back direction, for example, processing of deleting the static object Mx from these range gate images RG as a background light component is executed in step S1, for example. The processing of step S3 is then executed using a range gate image RG in which the static object Mx has been deleted.

In the example of FIG. 9, since the static object Mx has been detected on both the range gate image $RG_1$ in the first range $b_1$ and the range gate image $RG_2$ in the second range $b_2$, the processing of deleting the static object Mx from the range gate images $RG_1$ and $RG_2$ as a background light component is executed. The other operation is similar to that in the above embodiment, and similar effects are obtained.

Second Embodiment

Figure 11:
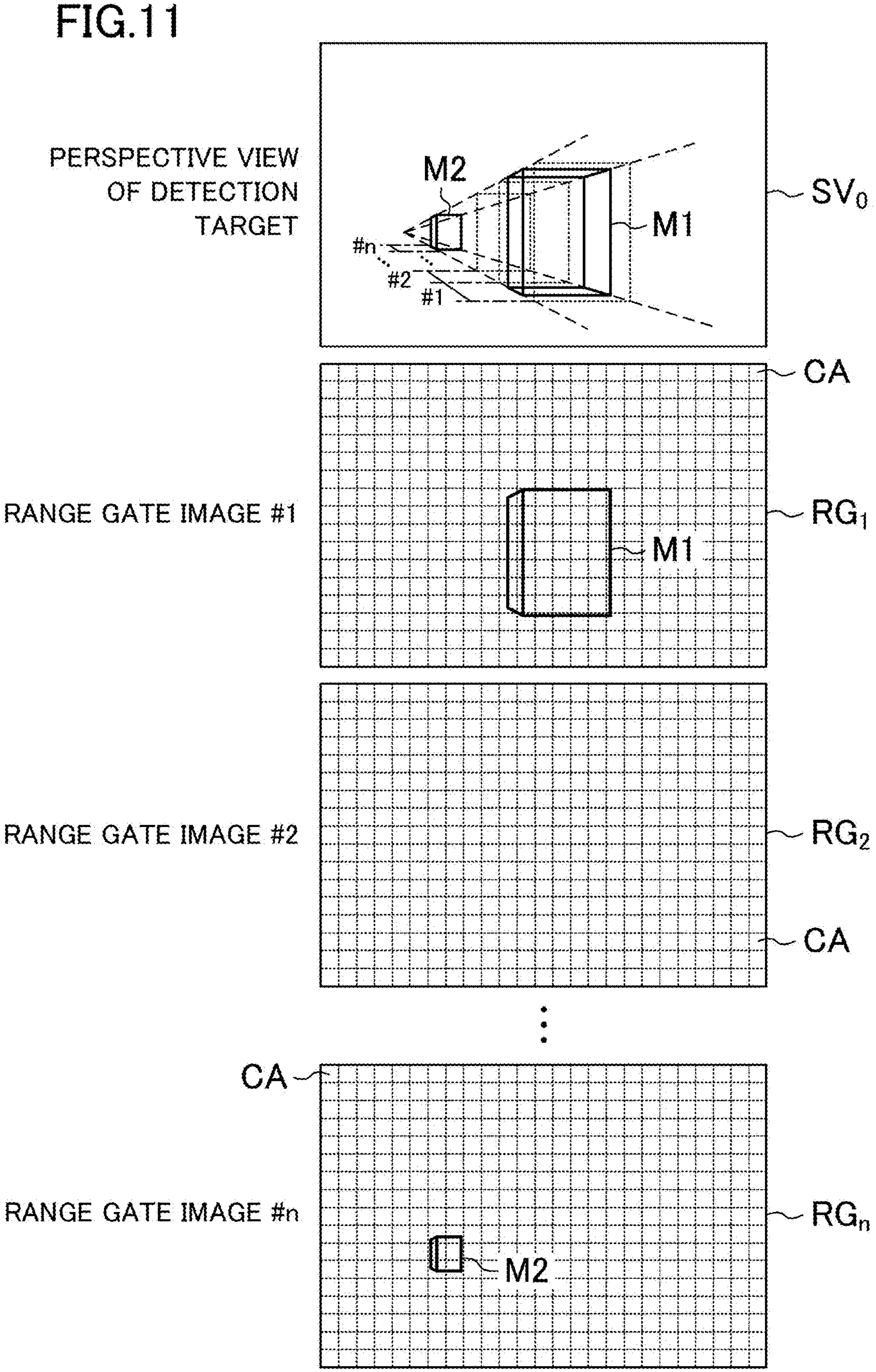
FIG. 11 illustrates an operation example of an image processing device of the second embodiment.

FIG. 11 illustrates an operation of an image processing device of the second embodiment and an image processing method according to the present disclosure. Note that the configuration and basic operation of the image processing device 1 are similar to those in the first embodiment, and therefore description will be made here centering different points from the first embodiment.

In this embodiment, when the number of pixels in the range gate image RG in a set distance range exceeds a set number of pixels corresponding to the capture distance S at the search in step S3, it is determined that the detection target is present on this range gate image RG in step S4, i.e., the detection target has been detected in step S4. Specifically, the set number of pixels is set to be gradually smaller as the capture distance S is longer.

In the case of using the method in this embodiment, also, since the search is performed for the number of pixels corresponding to the capture distance S at the range gate imaging device 2, it is possible to avoid wasteful search of searching a range gate image RG having the number of pixels that does not match with the size of the detection target M. Therefore, the image region of the detection target can be extracted automatically at high speed.

Also, by using the method of this embodiment, an effect that the computation amount can be further reduced compared with the method of the first embodiment is obtained.

Other Embodiment

The present disclosure is not limited to the embodiments described above, but various modifications may be made without departing from the spirit of the disclosure.

For example, the above embodiments and alterations may be combined in various ways, or the alterations may be mutually combined, to provide a new embodiment. Specifically, the second embodiment and Alteration (3) of the first embodiment, for example, may be combined to provide a new embodiment.

The image processing method and the image processing device according to the present disclosure are significantly useful because they permit extraction of an image region of a detection target automatically at high speed.

The invention claimed is:

1. An image processing method, comprising:

first processing of acquiring a range gate image using a range gate imaging device that captures an image of a set distance range for a predetermined capture area;

second processing of searching for a detection target in the range gate image using a search window having a size corresponding to a capture distance from the range gate imaging device to the set distance range; and third processing of synthesizing, when a window region satisfying a predetermined condition is detected in the range gate image in the second processing, object information included in the window region and a grayscale image acquired using a grayscale imaging device that captures a grayscale image of the predetermined capture area and outputting the result.

2. The image processing method of claim 1, wherein the object information includes at least pixel information of an object captured in the window region satisfying a predetermined condition or information of a rectangular region in which the object is inscribed.

3. The image processing method of claim 2, wherein the object information includes information of the capture distance of the window region satisfying a predetermined condition.

4. The image processing method of claim 1, wherein the grayscale imaging device is a texture imaging device capturing a texture image.

5. The image processing method of claim 1, wherein when an object having a size corresponding to the capture distance is detected in the search window in the search of the second processing, it is determined that the window region satisfying a predetermined condition is present and the third processing is executed.

6. The image processing method of claim 1, wherein when the number of pixels of a static object detected in the search window exceeds a predetermined number corresponding to the capture distance in the search of the second processing, it is determined that the window region satisfying a predetermined condition is present and the third processing is executed.

7. The image processing method of claim 1, wherein in the third processing, the synthesizing is cutting-out processing of cutting out and extracting a region of the object information from the grayscale image, and a homography matrix from the range gate image to the grayscale image is calculated, and an expanded region expanded from the object information is regarded as a target of the cutting-out processing based on the homography matrix.

8. The image processing method of claim 7, wherein the range gate imaging device includes a light source and a camera, in the expanded region, a shadow region formed for the detection target by the light source is estimated based on at least either a positional relationship between the light source and the camera or the capture distance, and the expanded region is further expanded according to the shadow region.

9. The image processing method of claim 8, wherein the shadow region is estimated by adding thickness information of the detection target.

10. The image processing method of claim 8, wherein the shadow region is estimated based on the capture distance at which the window region satisfying a predetermined condition has been detected in the third processing.

11. An image processing device, comprising:

a range gate imaging device that captures a range gate image in a set distance range for a predetermined capture area;

a grayscale imaging device that captures a grayscale image of the predetermined capture area; and a processor configured to perform operations comprising:

searching for a detection target in the range gate image using a search window having a size corresponding to a capture distance from the range gate imaging device to the set distance range; and synthesizing, when a window region satisfying a predetermined condition is detected in the range gate image, object information included in the window region and the grayscale image acquired using the grayscale imaging device; and outputting a result of the synthesizing.

12. The image processing device of claim 11, wherein the object information includes at least pixel information of an object captured in the window region satisfying a predetermined condition or information of a rectangular region in which the object is inscribed.

13. The image processing device of claim 12, wherein the object information includes information of the capture distance of the window region satisfying a predetermined condition.

14. The image processing device of claim 11, wherein the grayscale imaging device is a texture imaging device capturing a texture image.

15. The image processing device of claim 11, wherein when an object having a size corresponding to the capture distance is detected in the search window during the searching, and the operations comprise synthesizing the object information and the grayscale image and outputting the result.

16. The image processing device of claim 11, wherein when the number of pixels of a static object detected in the search window exceeds a predetermined number corresponding to the capture distance during the searching, and the operations comprise synthesizing the object information and the grayscale image and outputting the result.

17. The image processing device of claim 11, wherein the synthesizing is cutting-out processing of cutting out and extracting a region of the object information from the grayscale image, and the operations comprise calculating a homography matrix from the range gate image to the grayscale image, and regarding an expanded region expanded from the object information as a target of the cutting-out processing based on the homography matrix.

18. The image processing device of claim 17, wherein the range gate imaging device includes a light source and a camera, and the operations comprise estimating a shadow region formed for the detection target by the light source based on at least either a positional relationship between the light source and the camera or the capture distance, and further expanding the expanded region according to the shadow region.

19. The image processing device of claim 18, wherein the operations comprise estimating the shadow region by adding thickness information of the detection target.

20. The image processing device of claim 18, wherein the operations comprise estimating the shadow region based on the capture distance at which the window region satisfying a predetermined condition has been detected.

* * * * *